United States Patent
Lin (10) Patent No.: US 8,449,808 B2
(45) Date of Patent: May 28, 2013

(54) PLASTIC SHELL WITH INK-FREE PATTERN AND ITS MANUFACTURING METHOD THEREOF

(75) Inventor: Shu-Chen Lin, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 490 days.

(21) Appl. No.: 12/659,431

(22) Filed: Mar. 9, 2010

(65) Prior Publication Data

US 2011/0097540 A1 Apr. 28, 2011

(30) Foreign Application Priority Data

Oct. 27, 2009 (TW) .............................. 98136357 A (51) Int. Cl.
*B29C 35/08* (2006.01)
*B29C 59/16* (2006.01)
*B44C 1/20* (2006.01)
*B44C 1/22* (2006.01)
*H05B 6/00* (2006.01)

(52) U.S. Cl.
USPC ........... 264/482; 264/400; 264/446; 264/447; 264/478; 156/219; 216/94

(58) Field of Classification Search ......................... None
See application file for complete search history.

(56) References Cited

U.S. PATENT DOCUMENTS

| 4,845,000 A * | 7/1989 | Takeoka et al. ................. 430/14 |
| 5,768,076 A * | 6/1998 | Baumgart et al. ............. 360/135 |
| 5,830,514 A * | 11/1998 | Barenboim et al. ....... 425/174.4 |
| 5,875,084 A * | 2/1999 | Baumgart et al. ............. 360/135 |
| 6,013,336 A * | 1/2000 | Baumgart et al. ............. 427/555 |
| 6,059,555 A * | 5/2000 | Barenboim et al. .......... 425/135 |
| 8,122,740 B2 * | 2/2012 | Lesche ............................ 65/102 |
| 8,226,878 B2 * | 7/2012 | Huo et al. ...................... 264/400 |
| 2004/0000744 A1 * | 1/2004 | Grigg et al. .................... 264/401 |
| 2005/0181204 A1 * | 8/2005 | Wang et al. .................... 428/354 |
| 2006/0087058 A1 * | 4/2006 | Hooker .......................... 264/400 |
| 2010/0156007 A1 * | 6/2010 | Huang et al. .................. 264/478 |

FOREIGN PATENT DOCUMENTS

| CN | 101365304 A | 2/2009 |
| TW | 544077 | 7/2003 |
| TW | 200642866 | 12/2006 |
| TW | 200728054 | 8/2007 |
| TW | 200930216 | 7/2009 |

* cited by examiner

*Primary Examiner* — Benjamin Schiffman
(74) *Attorney, Agent, or Firm* — Rabin & Berdo, P.C.

(57) ABSTRACT

A plastic shell with ink-free pattern and its manufacturing method thereof are provided. The manufacturing method includes a step of providing a multilayered film with ink-free pattern, a step of adhering a protective layer of the multilayered film on a surface of a plastic shell body, and a step of performing a laser engraving procedure to present a relief pattern on a surface of the protective layer.

8 Claims, 9 Drawing Sheets

Fig. 8B pop# PLASTIC SHELL WITH INK-FREE PATTERN AND ITS MANUFACTURING METHOD THEREOF

RELATED APPLICATIONS

This application claims priority to Taiwan Application Serial Number 98136357, filed Oct. 27, 2009, which is herein incorporated by reference.

BACKGROUND

1. Technical Field

The disclosure relates to a method of manufacturing a shell, more particularly to a method of manufacturing a plastic shell.

2. Description of Related Art

The appearance design of a case of an electrical product has become one of some considerations that consumers would pay attention to or purchase. In view of that, manufacturers dedicate to provide many kinds of electrical products featuring distinguished appearances or styles one after another. One of the common ways to provide the electrical products with distinguished appearances is to present colored patterns printed on the case thereof by using inked color paint, so that consumers who are used to pursuing products with novelty and fashion appearances would be interested and motivated to purchase one of them.

In addition, in order to massively manufacture the cases of the electrical products and satisfy a demand of convenience to carry for users, the cases of the electrical products are normally made of plastic materials by injection molding. After an case thereof is formed by injection molding, the case will be further sequentially processed by a colored primer coating step, an inked pattern printing step and a UV lacquer painting step to provide an exterior hard layer on the case.

However, organic solvents must be used a lot in the colored primer coating step and the inked pattern printing step, and some drawbacks will be happened while putting plastic materials and organic solvents together.

When a plastic material is characterized with highly chemoresistance from the organic solvents, the organic solvents in the inked color paint is not easy to unite with the plastic material, thus, the inked color paint will be difficult to stay on an case having the plastic material, even the inked color paint will be easily peeled from the case.

Contrarily, when another plastic material is characterized with low chemoresistance from the organic solvents, the plastic material would be eroded by the organic solvents, so that cases having the plastic material might be cracked or damaged seriously, as a result, the defective rate of the cases is increased.

Furthermore, since some paint products has some ingredients (e.g. Halogen or heavy metals) which are unable to recycle completely or possible to endanger the local environment, the paint products will be restricted to use or sell in some business trading areas or countries.

Recently, a technology of "In-Mold Roller" (IMR) is provided in production of cases of the electrical products. Before plastic material is injected into a mold of injection molding, an IMR film with inked patterns is provided between two separated dies of the mold. When the dies are closed together, the plastic material is liquefied and injected into the mold. After that, when the plastic material in the mold is formed and solidified, the inked patterns of the IMR film are transferred to print on it, so as to form a plastic case with inked patterns printed thereon.

Figure 1:
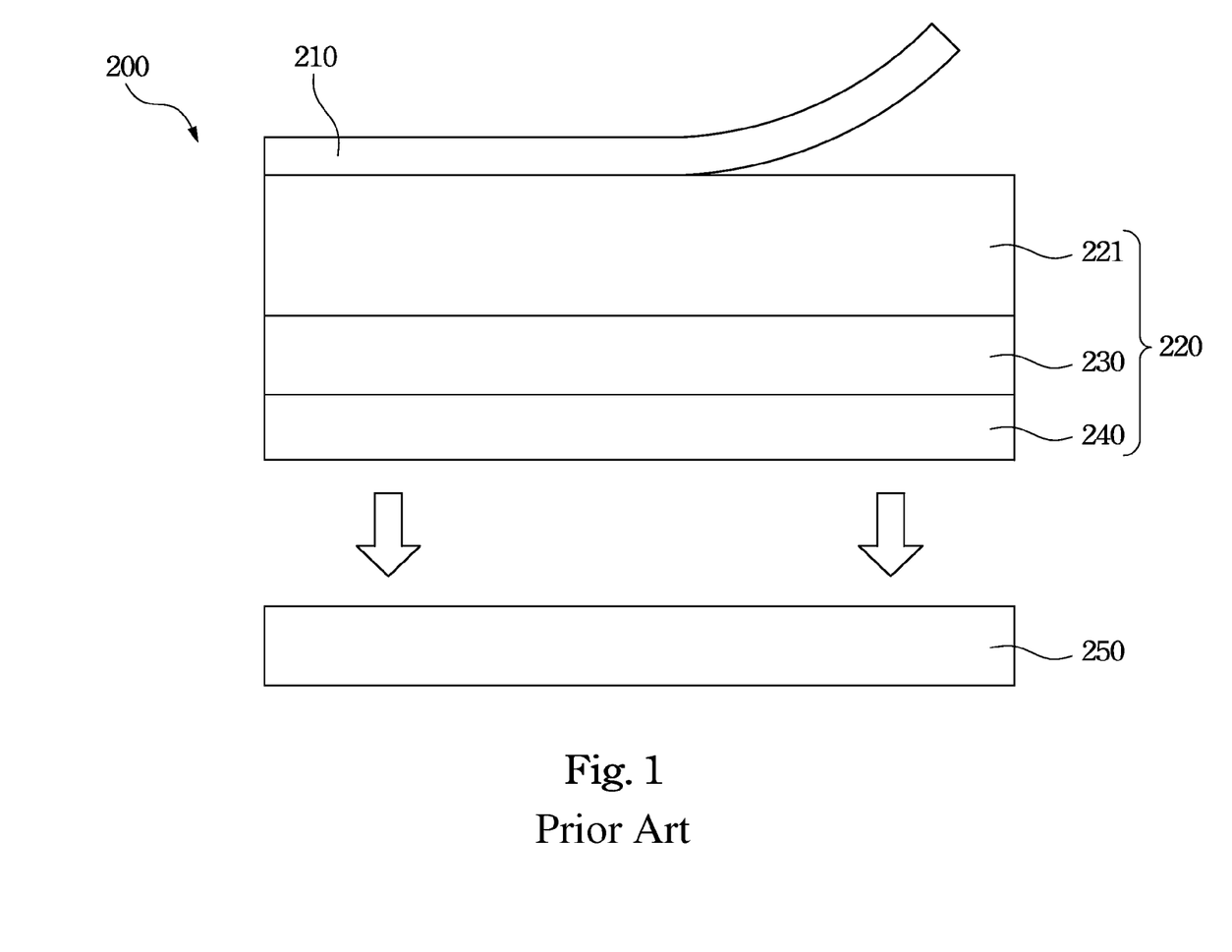
FIG. 1 illustrates a schematic view of an IMR film for an IMR procedure.

Refer to FIG. 1 in which FIG. 1 is a schematic view of an IMR film to process the IMR procedure. The IMR film 200 includes a base film layer 210 (or called release film) and some transferable pattern units 220 equidistantly arranged on one surface of the base film layer 210. Each of the transferable pattern units 220 comprises a hard coating layer 221, an inked layer 230 and an adhering layer 240 sequentially stacked up on the base film layer 210. The inked layer 230 has at least one pattern composed with inks or paints.

When the dies mentioned above are closed together to clip one of the transferable pattern units 220 between the dies thereof, the liquefied plastic material is injected into the mold to directly encounter the adhering layer 240. When the plastic material is cooled and formed into a solidified case 250, the transferable pattern unit 220 is bonded on the solidified case by the adhering layer 240. After the solidified case 250 is rejected from the mold, the inked layer 230 can be observed as printed on the solidified case 250. Thus, the solidified case 250 with color patterns might provide features of artistic and identification.

However, the procedure of fabricating the IMR films 200 needs to make an electroformed printing plate with relevant patterns thereon in advance, and using the electroformed printing plate to print the patterns with ink on the base film layer 210 then. Therefore, since the procedure of fabricating the IMR films 200 is quite complicated, time consuming and labor intensive, the cost is high, so massive production has to be conducted to proportioning the fabrication cost to each finished product.

Furthermore, for a small-amount production or for customized products, the average selling price (ASP) cannot be lowered if the quantity of the IMR film fabrication is a small number. Thus; it will be a challenge to be overcome for the manufacturers.

SUMMARY

Therefore, an aspect of the disclosure is to present a manufacturing method of plastic shell with ink-free pattern.

The manufacturing method of plastic shell with ink-free pattern includes steps of providing a multilayered film with ink-free pattern, and then, performing adhering procedure, so that a protective layer of the multilayered film is adhered on a surface of a plastic shell, and performing a laser engraving procedure on the protective layer according to an image, so that a pattern corresponding to the image is presented on the protective layer.

In one optional embodiment, the multilayered film sequentially comprises a base film layer, a protective layer and an adhesive layer.

In another optional embodiment, the protective layer, which is mainly made of Poly methacrylate or Acrylic polymer, is averagely coated on the base film layer, and the adhesive layer is located on the protective layer.

Therefore, the protective layer is coupled to and uniformly coated on a surface of the formed plastic shell.

Since the multilayered film is made without the inked layer mentioned above, the manufacturing method of the disclosure does not need to provide the electroformed printing plate mentioned above, and does not have cost resulted in the inked pattern printing step, so as to further cut down the defective rate of manufacture.

Thus, by the laser engraving procedure, the manufacturing method of the disclosure has the following advantages.

1. Unlike a conventional printing procedure, the manufacturing method of the disclosure is capable of providing fine and delicate relief lines for patterns.

2. The disclosure does not need to make an electroformed printing plate for printing the patterns, thus, the disclosure can be operable in small-amount orders, so as to speed up the progress of manufacture, and lower the average selling price (ASP).

3. Since the disclosure does not need to use inked paint products, the manufacture can be simplified because the vendors do not need to compare the types or the characteristics of the plastic material. In addition, the disclosure also provides a solution of environmental protection.

Another aspect of the disclosure is to present a plastic shell with ink-free pattern.

The plastic shell with ink-free pattern can be made by the manufacturing method of the disclosure. The plastic shell includes a plastic shell body, a protective layer, and at least one pattern. The protective layer is coupled to a surface of the plastic shell body. The pattern is composed by a plurality of relief lines which are disposed on the protective layer.

Thus, the plastic shell with ink-free pattern has the following advantages.

1. Because of the protective layer, the plastic shell can be protected from being scratched by hard objects so as to increase its durability. Also, the protective layer presents highly shine for the plastic shell to advantageously upgrade the artistic value of the plastic shell.

2. Since the plastic shell is decorated with patterns having relieved impression, the plastic shell can be observed with a special three-dimensional vision and a relieved touch. In addition, the patterns of the plastic shell with a special color are uneasy to age or release from the plastic shell.

3. Since the plastic shell is ink-free and recyclable to reuse, thus, the disclosure follows a trend of environmental protection.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 2:
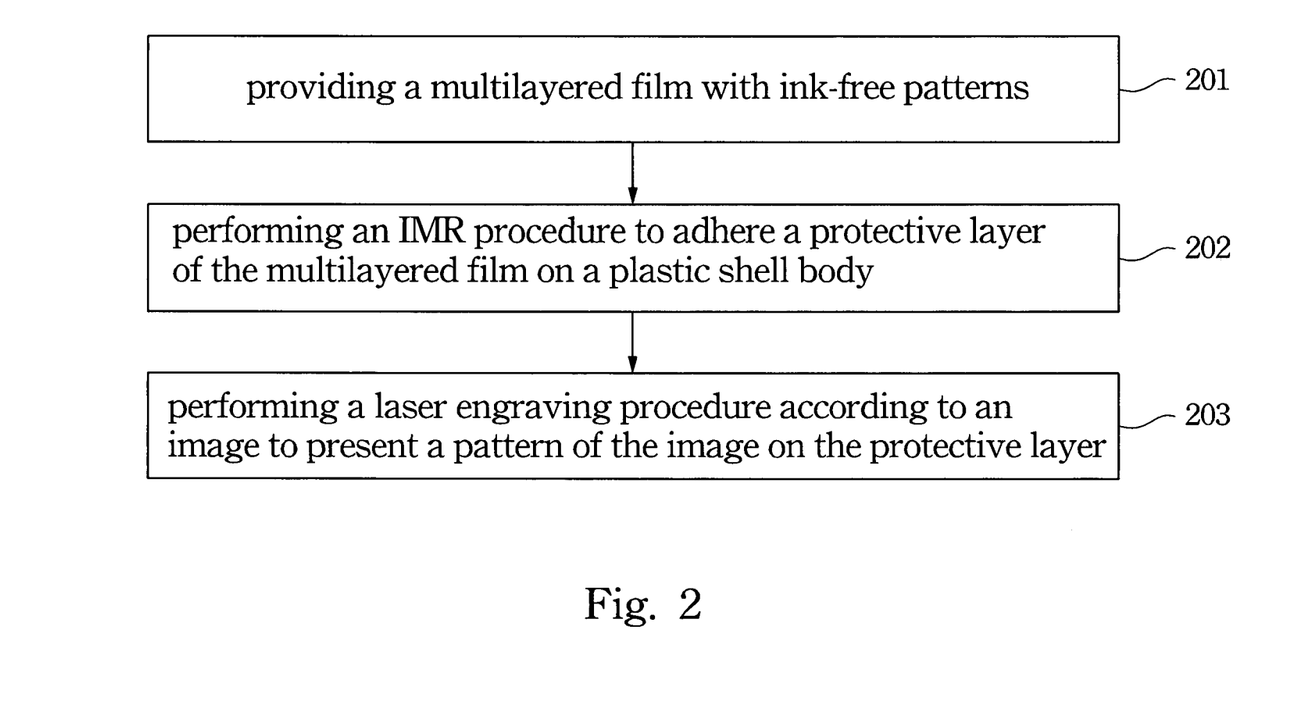
FIG. 2 illustrates a flow chart of a manufacturing method of a plastic shell with ink-free pattern according to one embodiment of the disclosure.

Refer to FIG. 2, which illustrates a flow chart of a manufacturing method of a plastic shell with ink-free pattern according to one embodiment of the disclosure. The disclosure provides a plastic shell with ink-free pattern and its manufacturing method thereof. The manufacturing method has some steps as follows:

Step 201: providing a multilayered film with ink-free patterns.

Step 202: performing an In-mold roller procedure, so that a protective layer (e.g. hard coating layer) of the multilayered film is transferred to adhere to a surface of a plastic shell body formed in a heated and pressured environment of the IMR step.

Step 203: performing a laser engraving procedure on the protective layer to form a pattern according to an image, so that the pattern can be presented on the protective layer corresponding the image.

Thus, by laser beams of the laser engraving procedure, the manufacturing method of the disclosure outputs a plastic shell with ink-free pattern.

Figure 3:
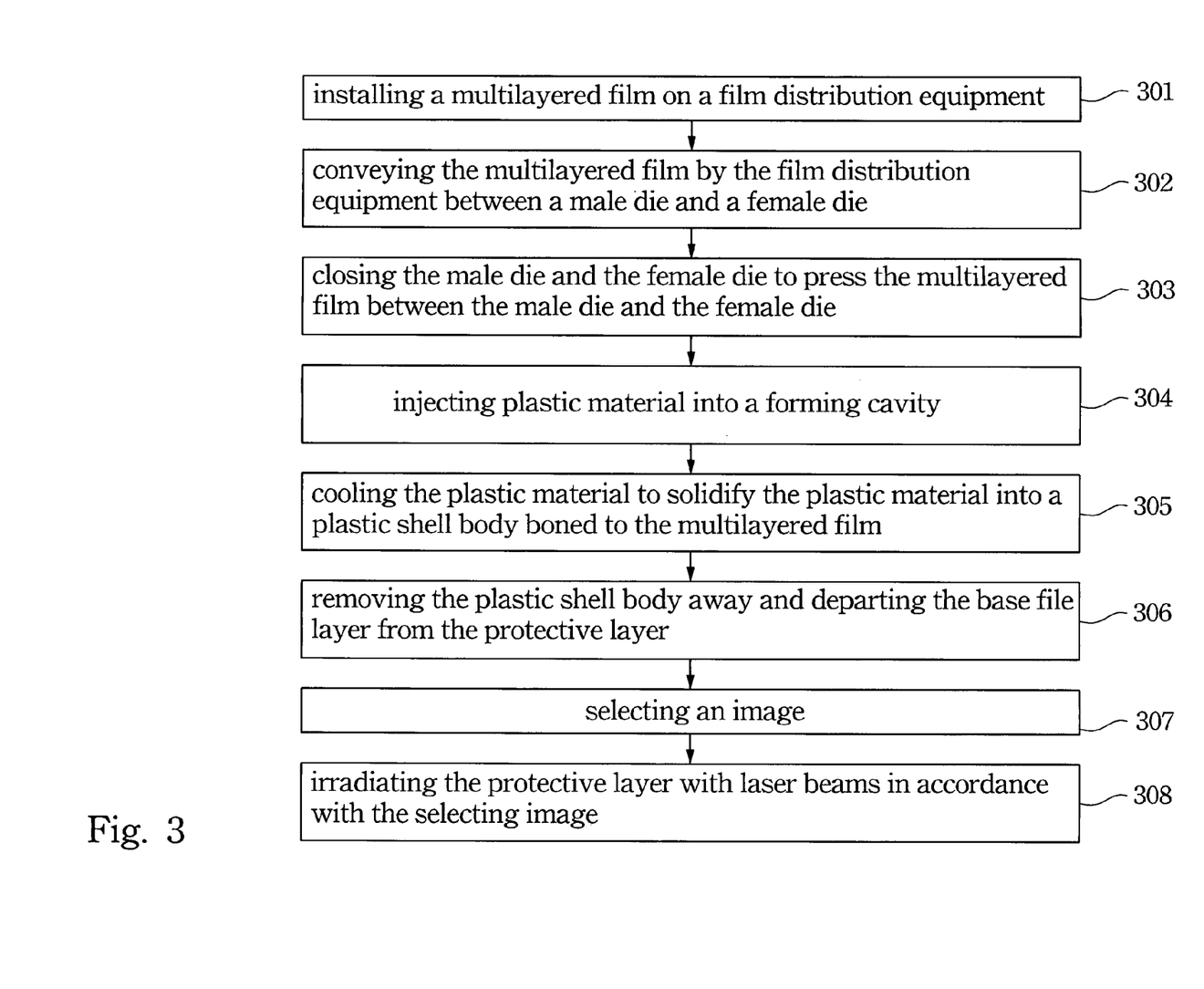
FIG. 3 illustrates a detailed flow chart regarding each of the steps in FIG. 2.
Figure 7:
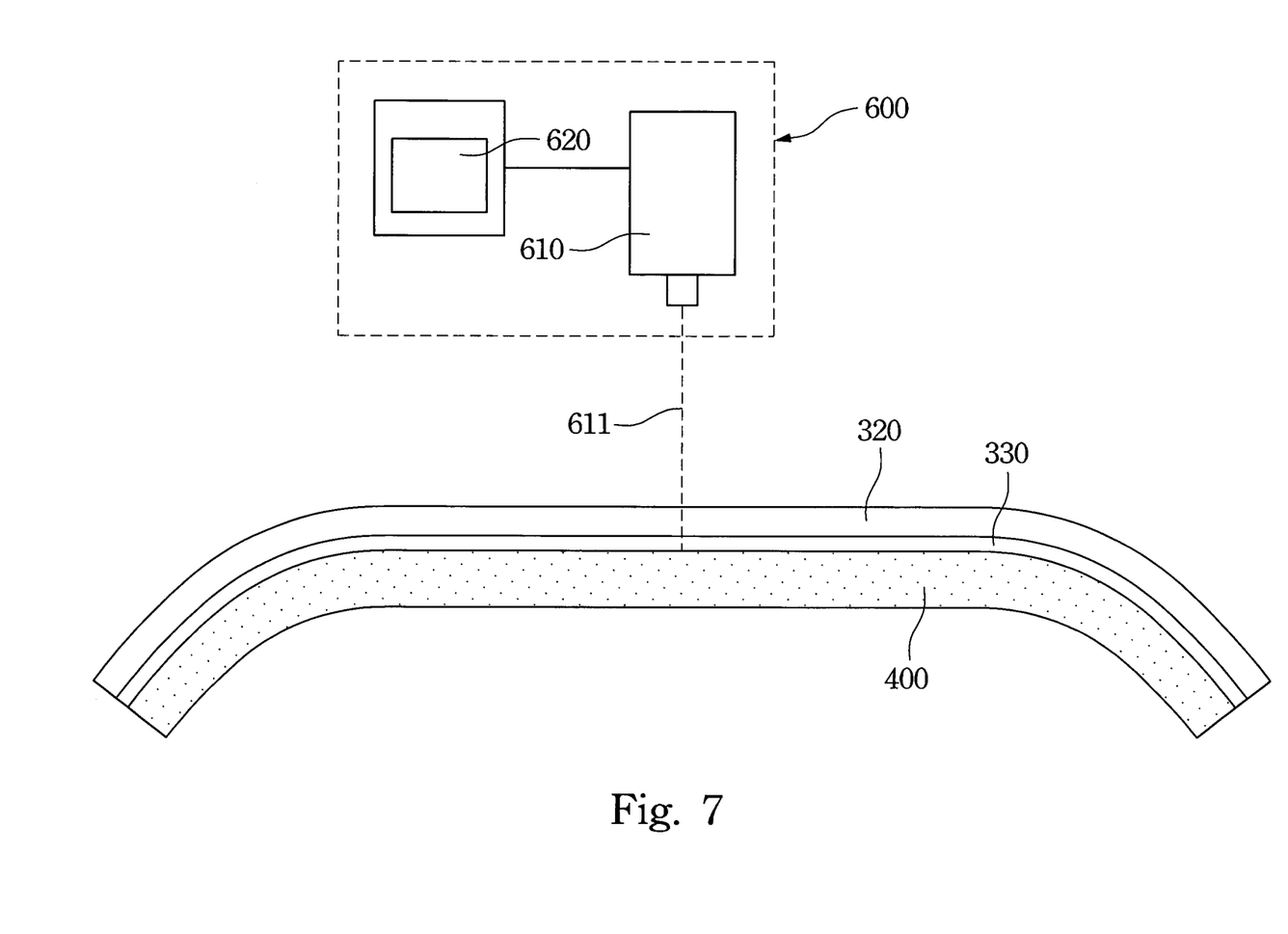
Figure 8A:
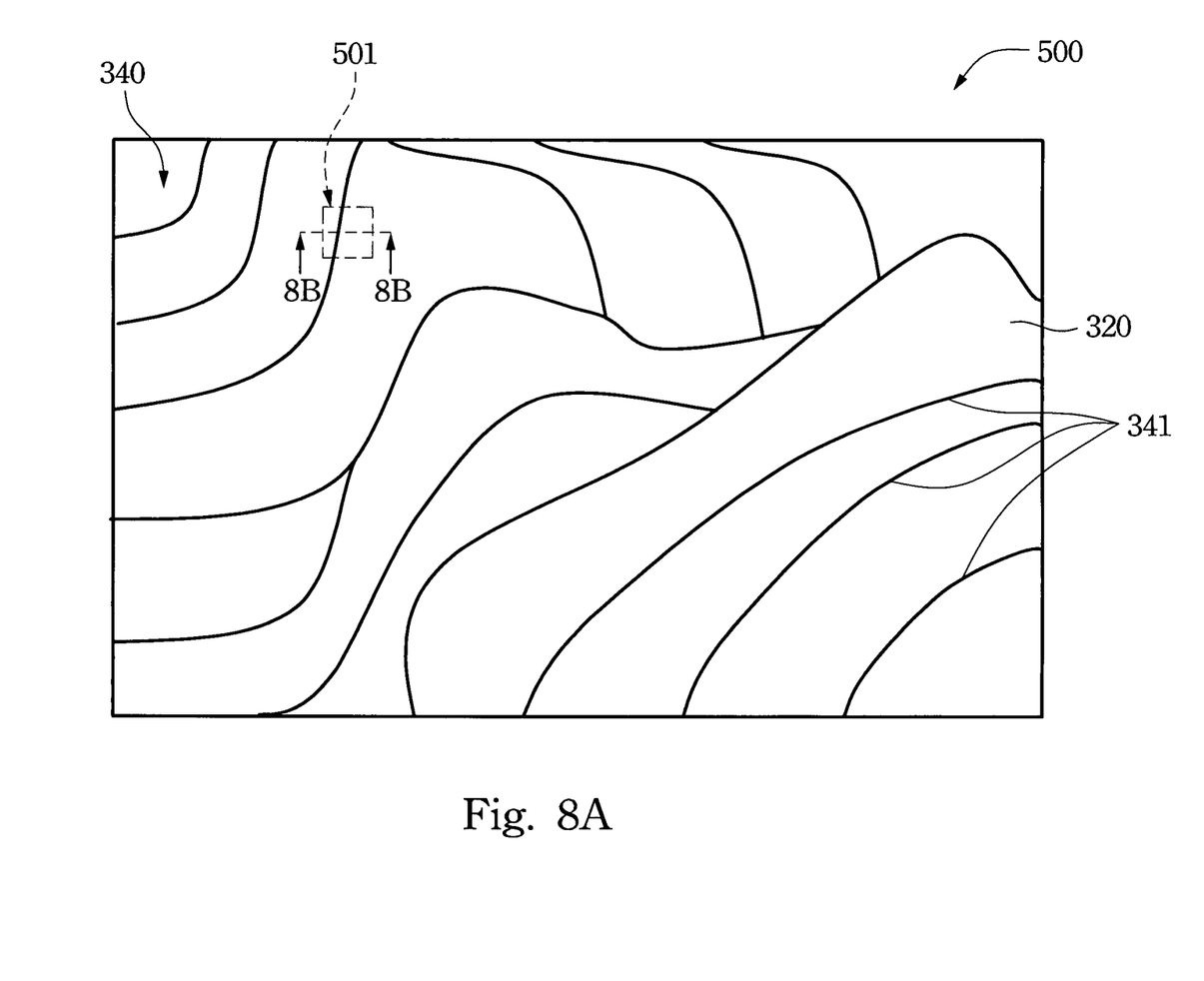
FIG. 8A illustrates a schematic view of a plastic shell with ink-free pattern according to the embodiment of the disclosure.
Figure 8B:
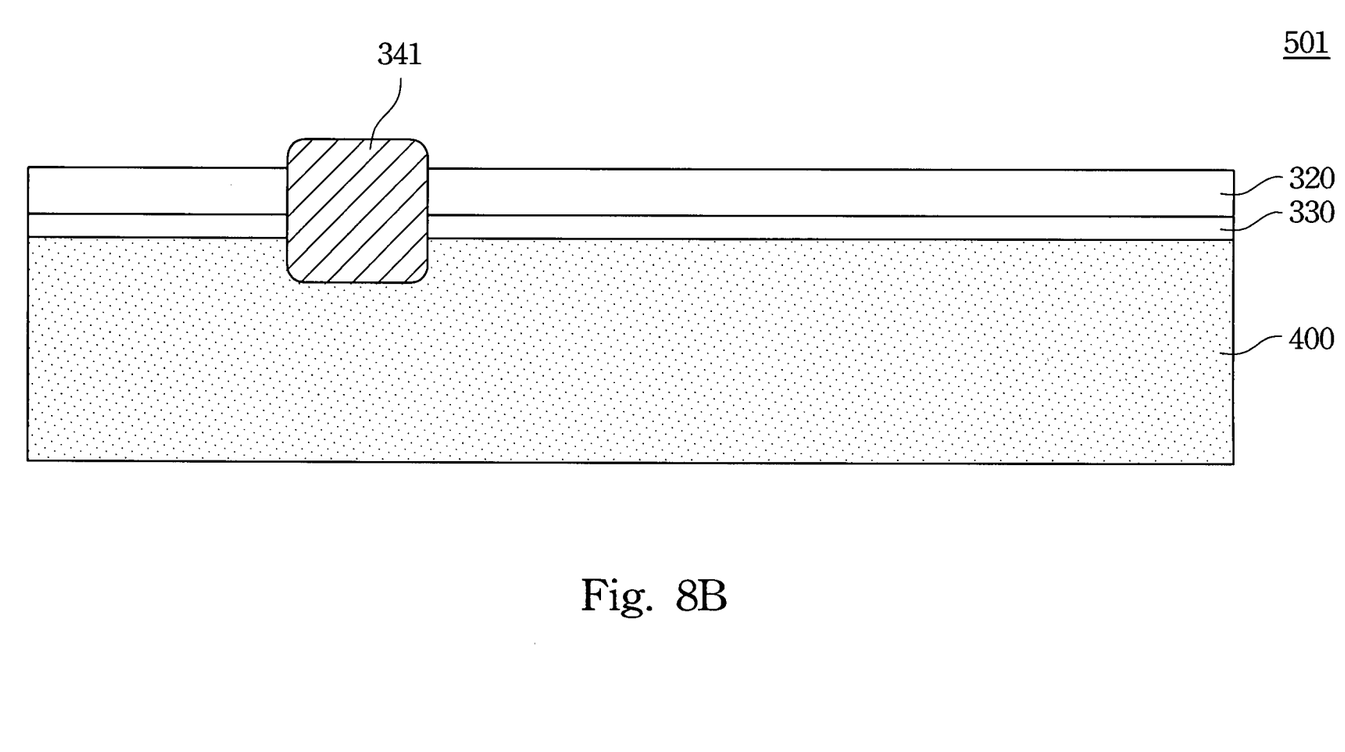
FIG. 8B illustrates a partial cross sectional view according to an area 501 of FIG. 8A.

Refer to FIG. 3, which illustrates a detailed flow chart regarding each of the steps in FIG. 2. While referring to FIG. 3, also sequentially check FIG. 4 to FIG. 8B in which FIG. 4 to FIG. 7 respectively illustrate schematic views respectively regarding each step in FIG. 3 according to the manufacturing method of a plastic shell with ink-free pattern of the disclosure, and FIG. 8A illustrates a schematic view of a plastic shell with ink-free pattern according to the embodiment of the disclosure, and FIG. 8B illustrates a partial cross sectional view according to an area 501 of FIG. 8A.

Figure 4:
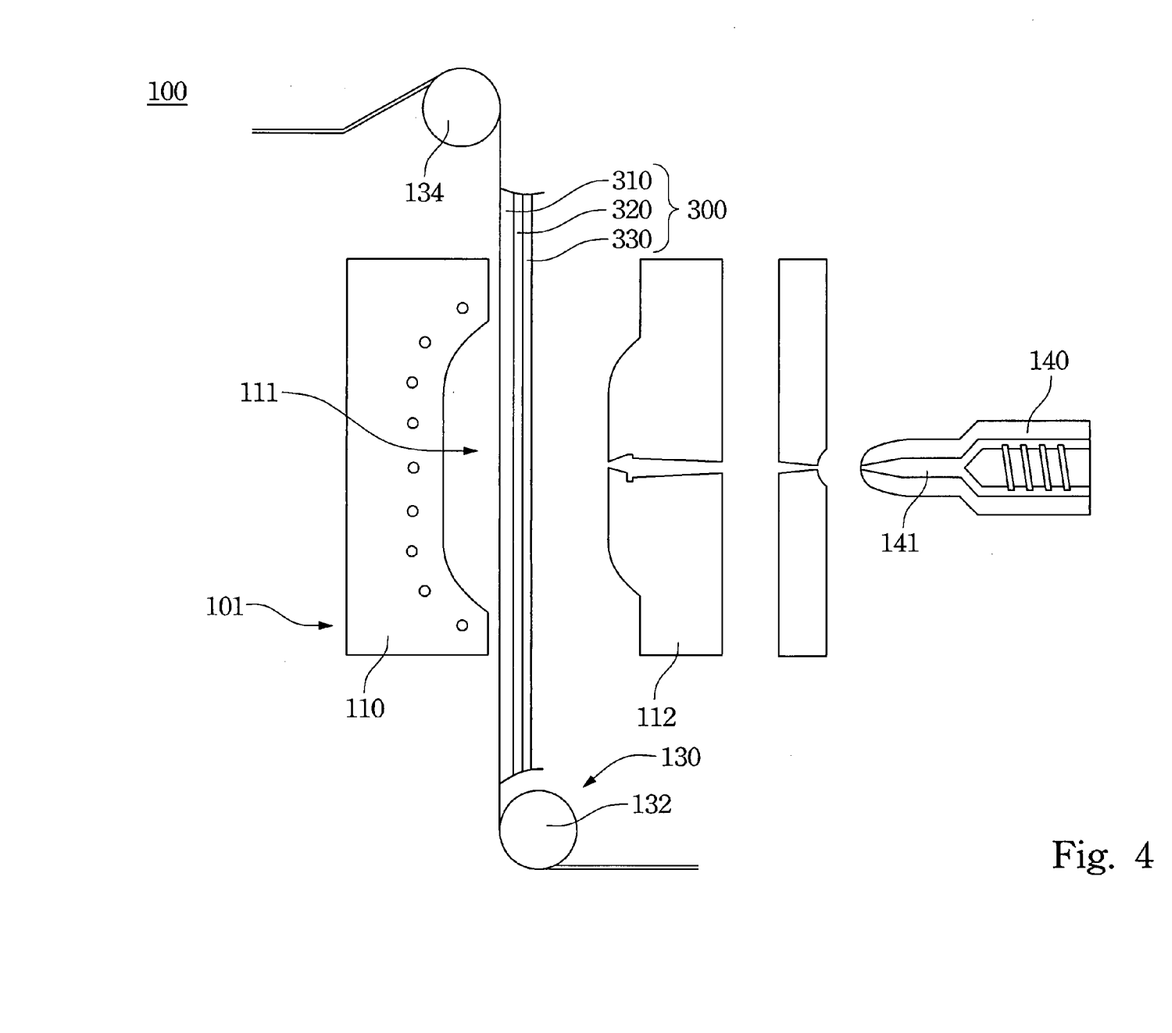
FIG. 4~FIG. 7 illustrate schematic views respectively regarding each step in FIG. 3 according to the manufacturing method of a plastic shell with ink-free pattern of the disclosure.

Please refer to FIG. 4 in which FIG. 4 presents a system relevant to the In-mold roller procedure.

The system 100 includes an injecting molding steel mold 101, a film distribution equipment 130, and a plastic injection molding machine 140. The injecting molding steel mold 101 includes a male die 112 and a female die 110 which are capable of separating or closing with each other. A forming cavity 111 is defined by closing the male die 112 towards the female die 110, and located therebetween. The plastic injection molding machine 140 is disposed on one side of the male die 112 of the injecting molding steel mold 101. The film distribution equipment 130 distributes a multilayered film 300 between the male die 112 and the female die 110, and has a first roller 132 as a film-supplying end and a second roller 134 as a film-collecting end.

To be noticed, the multilayered film 300 sequentially includes a base film layer 310, a protective layer 320 and an adhesive layer 330 in which the protective layer 320 is uniformly coated on the base film layer 310, and the adhesive layer 330 is located on the protective layer 320. However, the multilayered film 300 does not have the inked layer 230 mentioned above.

The system 100 is in operation with the steps illustrated in FIG. 3 as follows:

1. Step 201 "providing a multilayered film with ink-free patterns" further includes detailed steps as follows:

Step 301: installing the multilayered film 300 on the film distribution equipment 130 so that two ends of the multilayered film 300 are set on the first roller 132 and the second roller 134 respectively (FIG. 4).

Step 302: activating the film distribution equipment 130 so that the multilayered film 300 is conveyed from the first roller 132 to the second roller 134 between the male die 110 and the female die 112 (FIG. 4).

Figure 5:
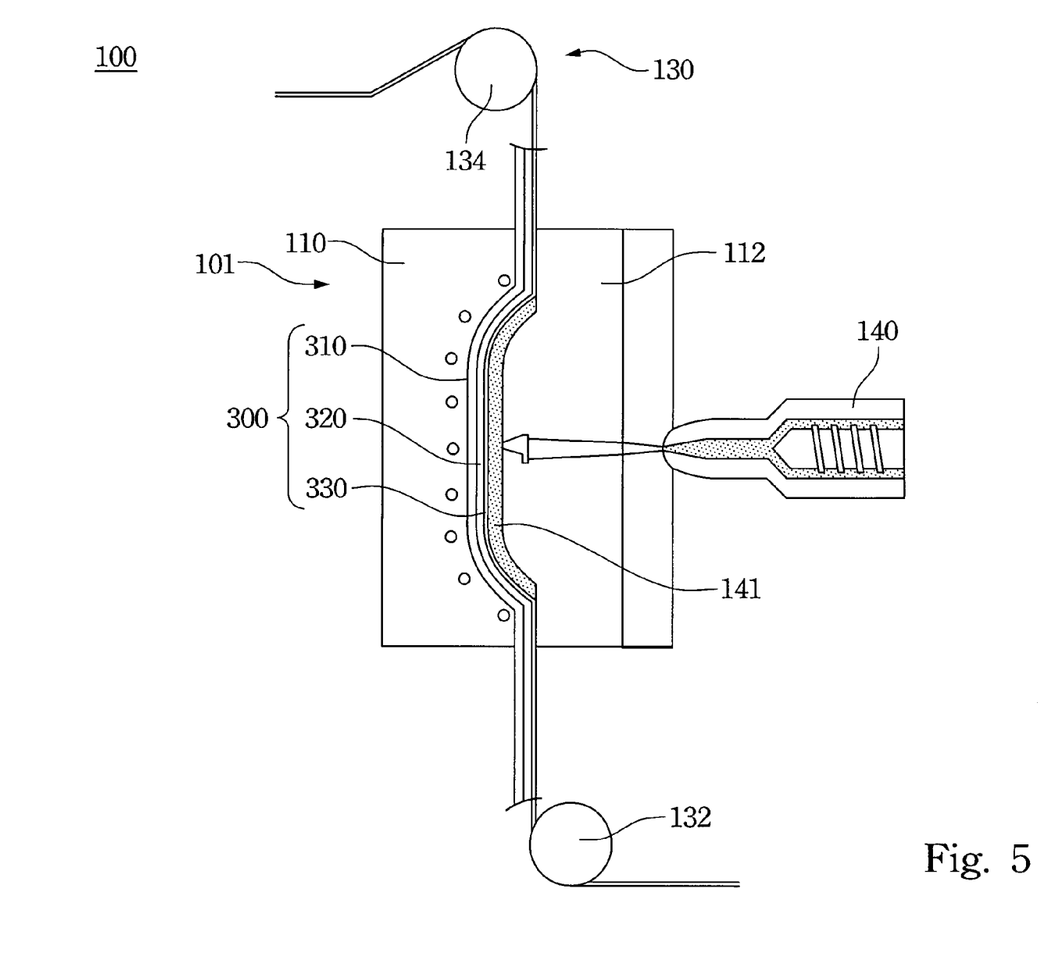

2. Step 202 "performing an In-mold roller procedure" further includes detailed steps (FIG. 5 and FIG. 6) as follows:

Step 303: closing the male die 110 and the female die 112, and pressing the multilayered film 300 between the male die 110 and the female die 112 (FIG. 5).

Unlike the conventional IMR film 200, in which the transferable pattern units 220 of the conventional IMR film 200 need to be detected whether one of them stays between the dies for alignment, the base film layer 310, the protective layer 320 and the adhesive layer 330 of the multilayered film 300 are continuously extended from the film-supplying end 132 and the film-collecting end 134, the system 100 does not need to have an identical mechanism for detecting the transferable pattern unit and a positioning mechanism for controlling the position of the transferable pattern.

Step 304: activating the plastic injection molding machine 140 to inject heated plastic material 141 into the forming cavity 111 by an injection molding manner. Thus, the heated plastic material 141 encounters the adhesive layer 330 directly and bonds to the adhesive layer 330 because of the heated and pressured environment of the forming cavity 111 (FIG. 5).

Figure 6:
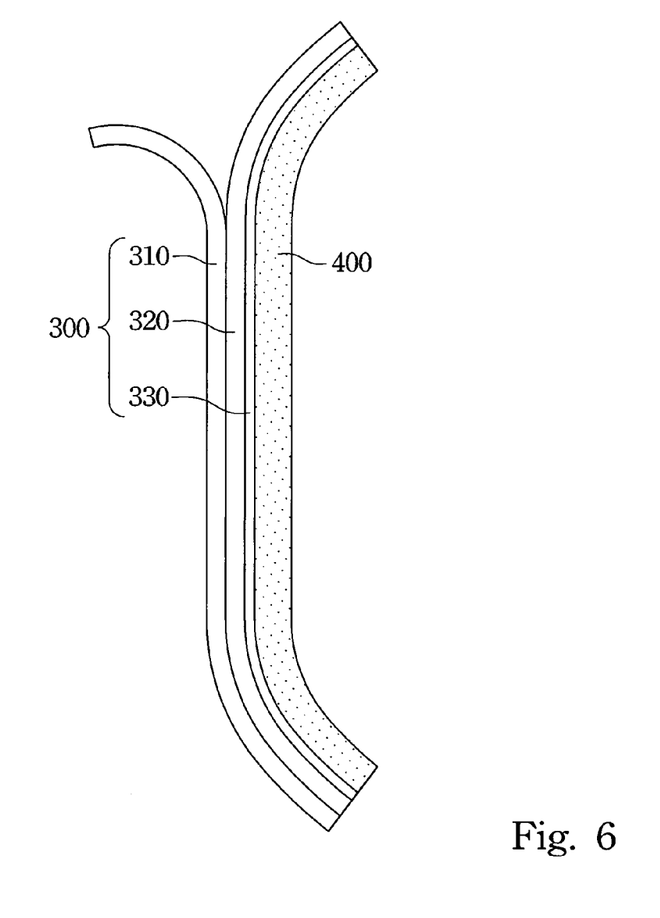

Step 305: cooling the plastic material 141 to solidify the plastic material 141 into a plastic shell body 400 boned to one surface of the multilayered film 300 in which the protective layer 320 is transferred to adhere to the plastic shell body 400 by the adhesive layer 330 (FIG. 6).

Step 306: performing a rejection step to remove the plastic shell body 400 away from the injecting molding steel mold 101, and to depart the base file layer 310 of the multilayered film 300 from the protective layer 320 coupled to the plastic shell body 400 by the adhesive layer 330 (FIG. 6).

3. Step 203 "performing a laser engraving procedure" further includes detailed steps (FIG. 7, FIG. 8A and FIG. 8B) as follows:

The laser engraving procedure can be operable by a laser-engraving machine 600. The laser-engraving machine 600 is capable of providing one/some patterns on a surface of an object by laser beams. The laser-engraving machine 600 can provide varied outputs according to different power or beam density of the laser beams. The laser-engraving machine 600 controlled by computed programs can provide a pattern as fine as the one shown in photograph.

Step 307: selecting an image.

The laser-engraving machine 600 implemented on an optional embodiment thereof has a database 620(FIG. 7). The database 620 offers users several images stored therein for selecting one of them, or the users can input a proper image to the database 620.

Step 308: irradiating the protective layer 320 with laser beams in accordance with the selected image, so that the selected image can be presented as a pattern on the protective layer 320(FIG. 8A).

The laser-engraving machine 600 further has a laser beam generator 610. In this embodiment, when the laser-engraving machine 600 is activated, according to the selected image, the laser beam generator 610 produces a plurality of laser beams 611 to the protective layer 320. Then, the laser beams 611 with high energy thereof melt the protective layer 320 and marks are generated on each position of the protective layer 320 where the laser beams 611 irradiated (corresponding the selected image), which in turns forming the pattern 340 (FIG. 8A), so that a plastic shell 500 is finished.

Here, the laser beams 611 could gather huge energies on the protective layer 320 to melt the protective layer 320 to produce the pattern 340(FIG. 8A) swelled from the protective layer 320 with a special three-dimensional vision and a relieved touch (FIG. 8B).

An optional embodiment of the disclosure, the laser beams 611 are produced by a CO2 laser technology in which a wavelength of the CO2 laser is about 10600 nm. The CO2 laser is preferred not only the laser beams 611 of the CO2 laser can be absorbed by Acrylic polymer, but also it provides high accuracy, fast speed, stable performance and reliability. In addition, since the laser beams 611 go through the interior of the Acrylic polymer, the mark of the pattern 340 (FIG. 8A) will not be shed easily while being touched frequently.

Another optional embodiment of the disclosure, the laser beams 611, for example, adopts a dotted arrangement to produce a plurality of continuous dots aligned into the selected image, and the continuous dots sequentially melt the corresponding position of the protective layer 320 to produce a plurality relief dots and these relief dots connected together into some protruded lines 341 to present the pattern 340 on the protective layer 320.

Specifically, when the laser beams 611 irradiate the protective layer 320 of the plastic shell body 400, since the laser beam 611 are outputted with high temperature, by adjusting the irradiation depth and the energy of the laser beams 611, the protruded lines 341 (shown in dotted box 501, FIG. 8B) of the pattern 340 presented on the protective layer 320 will be different in color and size for a purpose of varying the line width or the color of the protruded lines 341.

In a specific embodiment, the irradiation depth, for example, can be 1 micron to 500 micron, the line width of the protruded lines 341, for example, can be 15 micron to 50 micron.

Another optional embodiment of the disclosure in the output of the laser beams 611 to the protective layer 320, according to different irradiation depths that the laser beams 611 irradiate respectively, users could control the laser beams 611 to irradiate only on the protective layer 320 to form a part of the pattern, and control the laser beams 611 to pierce through the protective layer 320 to irradiate a position of the plastic shell body 400 located right behind the protective layer 230 to form other part of the pattern. Thus, due to the difference of the irradiation depths of the laser beams 611, the pattern 340 presented on the plastic shell 500 can be observed with varied light reflection results so as to present different kinds of colors while being observed with different angles.

Therefore, according to the demands of the reality, the pattern 340 of the plastic shell 500 further can be arranged by protruded lines 341 or bulged blocks, which has different light reflective property.

To sum up, the plastic shell 500 can be applicable on a whole or partial shell of electric products such as computer, notebook, mobile phone, PDA, camera and a peripheral product of 3C electric product areas.

Describe again, the plastic shell 500 is provided with the plastic shell body 400, adhesive layer 330, the protective layer 320 and the pattern 340 in which the adhesive layer 330 is set between the plastic shell body 400 and the protective layer 320 so as to couple the protective layer 320 on a surface of the plastic shell body 400.

In practice, materials of the protective layer 320, for example, can be Poly methacrylate or Acrylic polymer. The adhesive layer 330 mentioned above for example has material of Polyether Urethane. The plastic shell body 400 and the plastic material 141 mentioned above has materials which are selected from the group consisting of Acrylonitrile Butadiene Styrene (ABS), Polycarbonate (PC), Polymethylmethacrylate (PMMA), Nylon, glass fibers, mineral fibers (Talc), carbon fibers, and the combinations thereof such as composite materials of Acrylonitrile Butadiene Styrene (ABS) and Polycarbonate (PC), composite materials of Nylon and glass fibers, or composite materials of Polycarbonate (PC) and carbon fibers. If the composite materials comprises mineral fibers (Talc) and glass fibers (or carbon fiber), the proportion (%) of the mineral fibers (Talc) and glass fibers (or carbon fiber) from the composite materials in a preferred embodiment thereof is 15%. However, the proportion of the mineral fibers (Talc) and glass fibers (or carbon fiber) should be adjusted upon the reality requirements.

To be noticed, the materials being exampled above only are for illustration, not for limiting the scope of the disclosure. Furthermore, the pattern 340 mentioned above can be any one of the images chosen by the venders, such as one/more characters, one/more trademark logos, one/more decorative marks or one/more meaningless pictures etc.

Because the disclosure produces the patterns by the laser engraving procedure, a plastic shell of the disclosure does not have to provide patterns with inked layer. In addition, the disclosure further enhances the hardness and durability of the surface of the plastic shell, so as to lower the possibility that the surface of the plastic shell being scraped and damaged, accordingly, the durability of the patterns on the plastic shell can be increased.

Thus, the disclosure of manufacturing method of plastic shell with ink-free pattern has advantages as follows:

1. Unlike a conventional printing procedure, the manufacturing method of the disclosure is capable of providing fine and delicate relief lines for patterns.

2. Unlike to make an electroformed printing plate for printing the patterns, in the manufacturing method of the disclosure, users can only select or input an image into the laser-engraving machine, the laser-engraving machine produces patterns on the plastic shell. Thus, the disclosure speeds up the progress of product developments, lowers the cost of the product developments, and further enhances the flexibility of the product developments so as to provide product diversification easily and unique customization.

3. Since the disclosure does not need to use inked paint products, thus, the manufacture can be simplified because the vendors do not need to compare the types or the characteristics of the plastic material. In addition, the disclosure also provides a solution of environmental protection.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of manufacturing a plastic shell with an ink-free pattern, comprising:
providing a multilayered film with the ink-free pattern;
adhering a protective layer of the multilayered film on a surface of a plastic shell body; and
irradiating the protective layer of the multilayered film with a plurality of laser beams to form a plurality of relief lines protruding from the protective layer of the multilayered film, wherein a part of the laser beams irradiates to the protective layer of the multilayered film, and another part of the laser beams pierces through the protective layer of the multilayered film to irradiate a position of the plastic shell body located right behind the protective layer of the multilayered film.

2. The method according to claim 1, wherein the multilayered film sequentially comprises a base film layer, the protective layer and an adhesive layer.

3. The method according to claim 2, wherein the adhering step further comprises:
closing a male die and a female die, wherein the multilayered film with the ink-free pattern is in a forming cavity between the male die and the female die;
injecting a plastic material into the forming cavity, wherein the plastic material encounters the adhesive layer;
cooling the plastic material to form the plastic shell body in the forming cavity, wherein the multilayered film bonds to the surface of the plastic shell body by the adhesive layer; and
removing the base film layer from the protective layer of the multilayered film.

4. The method according to claim 2, wherein the protective layer is coated uniformly on a surface of the base film layer, and mainly comprises materials selected from Poly methacrylate and Acrylic polymer.

5. The method according to claim 1, wherein the plastic shell is made of materials selected from the group consisting of Acrylonitrile Butadiene Styrene (ABS), Polycarbonate (PC), Polymethylmethacrylate (PMMA), Nylon, glass fibers, mineral fibers, carbon fibers, and the combinations thereof.

6. The method according to claim 1, further comprising:
selecting one of images, wherein the laser beams irradiate to the protective layer of the multilayered film in accordance with the selected image by a dotted arrangement so as to form the relief lines.

7. The method according to claim 1, wherein irradiating the laser beams to the protective layer further comprises:
melting the protective layer to form the relief lines on the protective layer.

8. The method according to claim 1, wherein the relief lines form a character, a trademark logo, a decorative mark or a meaningless picture.

* * * * *